United States Patent [19]

Langlais et al.

[11] Patent Number: 5,181,229

[45] Date of Patent: Jan. 19, 1993

[54] DATA TRANSMISSION ARRANGEMENT USING A STATISTIC CODING, A TRANSMITTER AND A RECEIVER SECTION SUITABLE FOR SUCH AN ARRANGEMENT

[75] Inventors: Thierry Langlais, Issy Les Moulineaux; Jean-Paul Bastien, Maisse; Jean-Yves Boisson, Clamart, all of France

[73] Assignee: Telecommunications Radioelectriques El Telephoniques, Paris, France

[21] Appl. No.: 458,121

[22] Filed: Dec. 28, 1989

[30] Foreign Application Priority Data

Dec. 30, 1988 [FR] France .............................. 88 17498

[51] Int. Cl.⁵ ........................ H04N 5/04; H04N 7/133
[52] U.S. Cl. .................................... 375/114; 358/133; 358/146; 370/106; 375/122
[58] Field of Search ............... 375/114, 116, 118, 122; 370/105.4, 106; 371/47.1; 358/133, 138, 148, 427; 341/65

[56] References Cited

U.S. PATENT DOCUMENTS

| | | | |
|---|---|---|---|
| 3,662,114 | 5/1972 | Clark | 370/106 |
| 3,689,899 | 9/1972 | Franaszek | 371/47.1 |
| 3,849,994 | 7/1989 | Heitman et al. | 375/114 |
| 4,276,642 | 6/1981 | Siglow et al. | 370/106 |
| 4,696,690 | 8/1987 | Sato | 375/118 |
| 4,860,324 | 8/1989 | Satomura | 375/122 |

Primary Examiner—Benedict V. Safourek
Attorney, Agent, or Firm—Michael E. Marion

[57] ABSTRACT

A data receiver, and transmitter/receiver combination, for transmitting data using statistic coding. A data transmitter transmits statistic encoded data representing successive sample series in a form having a variable number of bits followed by two self-synchronizing codes, each self-synchronizing code including a suffix formed by a codeword or a concatenation of codewords. A data receiver for use with such a transmitted signal includes a correction circuit which can store at least one sample series, and a write counter for forming address codes defining locations of samples to be stored in the storage portion of the correction circuit. Preferably a sequencer provides a window signal which validates the output of a synchronizing signal detector in a time interval when the synchronizing word will probably be received.

3 Claims, 5 Drawing Sheets

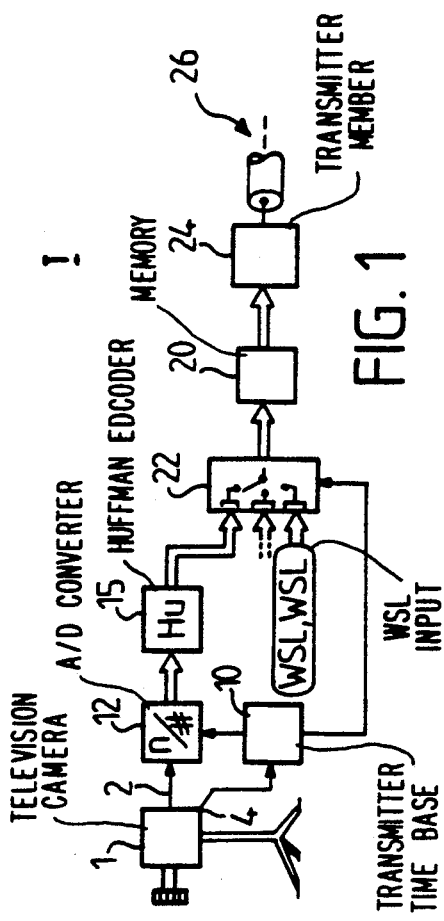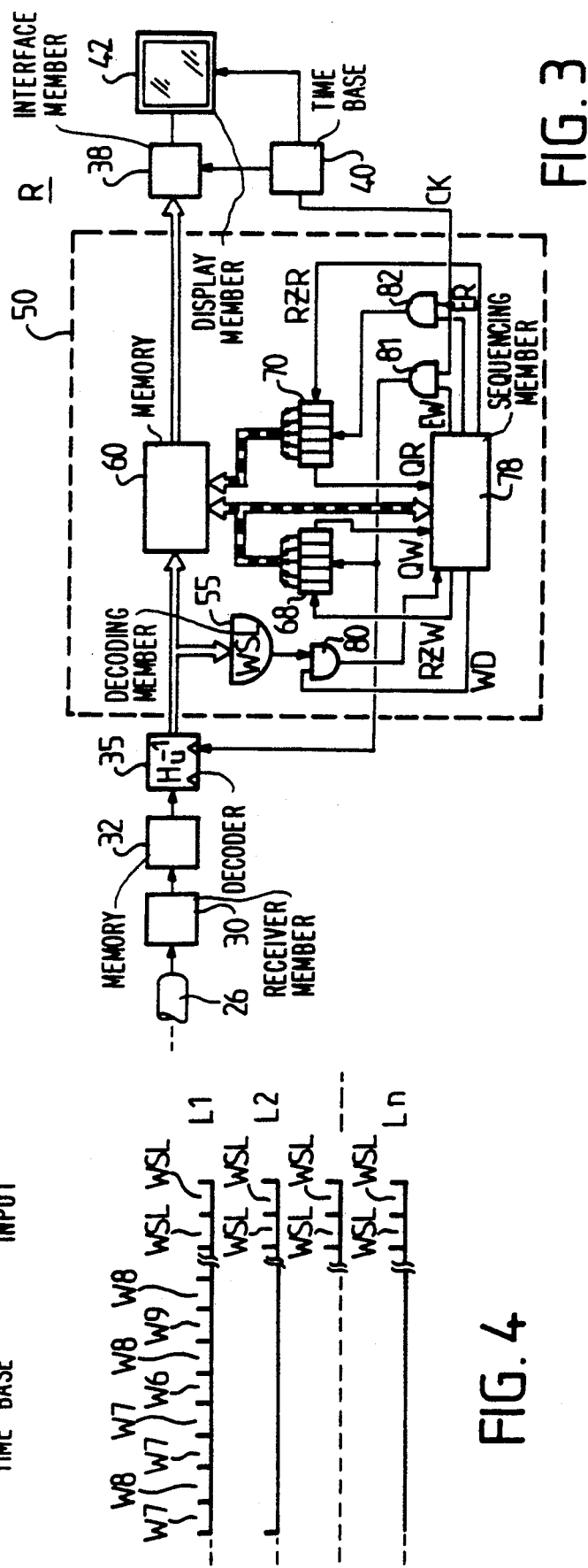

 $px \in L-1$ FIG. 7a
 $px \in L_0(i)$
$i \leq p$ FIG. 7b
 $px \in L_0(i)$
$p < i \leq p+k$ FIG. 7c
 $px \in L+1$ FIG. 7d

DATA TRANSMISSION ARRANGEMENT USING A STATISTIC CODING, A TRANSMITTER AND A RECEIVER SECTION SUITABLE FOR SUCH AN ARRANGEMENT

BACKGROUND OF THE INVENTION

The present invention relates to a data transmission arrangement, utilizing a statistic coding, the arrangement comprising a transmitting section intended for the transmission of data provided in the form of a digital sample series and at least one receiving section. The transmitting section includes a statistic encoding member for converting the digital samples into statistic codewords and a multiplexing circuit for inserting synchronizing words between the statistic codewords. Each receiving section is provided with a receiving member for receiving the transmitted codewords, and a correction circuit cooperating with a synchronizing word detection circuit to enable the recovery of the digital sample series after processing by a statistic decoding member so as to apply them to a user member.

Such an arrangement is used with great advantage in, more specifically, the transmission, in digital form, of television images, wherein each sample series then represents one picture line and the samples represent the picture elements (pixels).

The problem encountered in this type of arrangement is that it is sensitive to transmission errors. A transmission error affects in the first place the sample containing this error and may have repercussions on the subsequent samples. The result would be that, although the samples will ultimately be recovered appropriately, they no longer correspond to the position of the sample in the sequence. This change in place is propagated from line to line and thus an image of a highly degraded quality is obtained. The use of a synchronizing code renders it possible to solve this problem.

In the French Patent Application no. 8709446 filed by Applicants on Jul. 3rd, 1987, to which U.S. Pat. No. 4,876,698 corresponds, it is proposed to distribute the synchronizing code over the packets. Although this measure is highly satisfactory as regards the errors still existing in packets, that is to say during a period of time exceeding the transmission period of a synchronizing codeword, Applicants have nevertheless looked for a solution which requires less material and ultimately renders, in actual practice, the arrangement appropriately insensitive to errors.

SUMMARY OF THE INVENTION

To that end, an arrangement of the type defined in the opening paragraph is characterized in that the synchronizing word is a self-synchronizing codeword inserted at least twice at the ends of the series.

A self-synchronizing code is a codeword having a suffix which is either a codeword, or the concatenation of several words of this code. The following article furnishes information on this subject: "Self-synchronizing Huffman Codes" by THOMAS J. FERGUSON et al, published in IEEE TRANSACTION ON INFORMATION THEORY, Vol. IT-30, no. 4, July 1984.

The invention also relates to a transmitter section suitable for use in such an arrangement, including a statistic encoding member to convert the digital samples to be transmitted into statistic codewords, and a multiplexing circuit to insert, between the statistic codewords of the synchronizing words, a self-synchronizing codeword which is repeated at least twice at the ends of the series.

Finally, the invention relates to a receiver section suitable for use in such an arrangement, comprising a receiving member intended to receive transmitted codeword series at whose ends there are disposed the synchronizing words formed by at least two self-synchronizing codewords, a self-synchronizing codeword detection circuit to supply a codeword recognizing signal, a storage member of a sufficient capacity to contain at least one sample series, a write counter for forming the address codes which define the locations of the samples to be stored, transmitted to said storage member, a read counter for defining the locations in the storage member for the samples to be applied to a user member, and a sequencing member intended to inhibit or allow the counters to progress.

BRIEF DESCRIPTION OF THE DRAWINGS

The following description which is given by way of non-limitative example with reference to the accompanying drawings, will make it better understood how the invention can be put into effect.

FIG. 1 shows the transmitting section of an arrangement according to the invention.

FIG. 3 shows the receiver section of an arrangement according to the invention.

FIG. 4 shows how, in accordance with the invention, the synchronizing codewords are inserted.

FIGS. 6a-6z have for their object to explain how the correction circuit functions.

FIGS. 7a-7d show captures referring to FIG. 6.

DETAILED DESCRIPTION OF A PREFERRED EMBODIMENT

Figure 2:
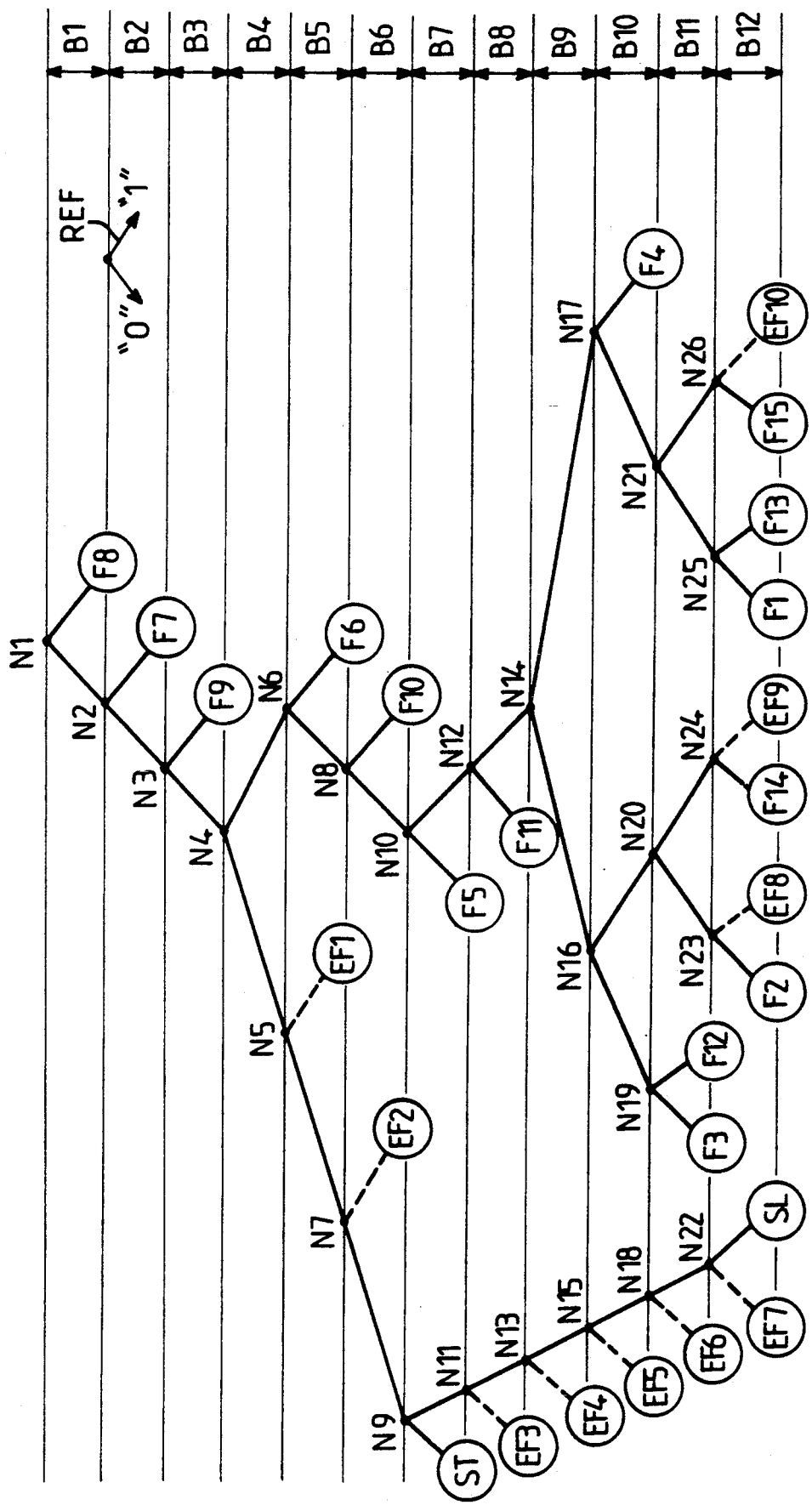
FIG. 2 shows the coding tree utilized to encode, in the statistical form, the samples to be transmitted.

In FIG. 1 the transmitting section T of an arrangement according to the invention is shown. The reference numeral 1 denotes a television camera. This camera supplies luminance signals from an output 2 and signals necessary for the appropriate functioning of a transmitter time base 10 from an output 4. The luminance signals are converted by means of an analog-to-digital converter 12 into a binary code comprising a fixed number of bits, for example 4. Thereafter this code is converted into a statistic code or Huffman code by means of an encoder 15, preferably of the type described in the French Patent Application no. 8810617 filed by Applicants on Aug. 5th, 1988 to which Applicants' copending U.S. application Ser. No. 07/389,721 corresponds. The following Table I defines the encoding used in the embodiment described here.

TABLE I

| Column 1 Ref. of the identified words | Column 2 Statistic code (in binary notation) | Column 3 Length | Column 4 Ref of the leaf |
|---|---|---|---|
| W8 | 1 | 1 | F8 |
| W7 | 01 | 2 | F7 |
| W9 | 001 | 3 | F9 |
| W6 | 00011 | 5 | F6 |
| W10 | 000101 | 6 | F10 |
| W5 | 0001000 | 7 | F5 |
| W11 | 00010010 | 8 | F11 |
| W4 | 0001001111 | 10 | F4 |
| W12 | 00010011001 | 11 | F12 |

TABLE I-continued

| Column 1<br>Ref. of the<br>identified words | Column 2<br>Statistic code<br>(in binary notation) | Column 3<br>Length | Column 4<br>Ref of the<br>leaf |
| --- | --- | --- | --- |
| W3  | 000100011000 | 11 | F3  |
| W2  | 000100110100 | 12 | F2  |
| W14 | 000100110110 | 12 | F14 |
| W1  | 000100111000 | 12 | F1  |
| W13 | 000100111001 | 12 | F13 |
| W15 | 000100111010 | 12 | F15 |
| WSL | 000000111111 | 12 | SL  |
| WST | 0000000      | 7  | ST  |

This encoding can alternatively be represented by a coding tree of the type shown in FIG. 2. In this Figure, the nodes N1 to N26 and the leaves F1 to F15, EF1 to EF10, ST and SL are defined.

The leaves represent the statistic codewords obtained when the tree is passed through, starting from the node N1. The first bit B1 of the statistic word will be a "1" if one goes to the right or a "0" if one goes to the left. This is denoted by the reference REF. A code is determined as soon as a leaf is reached and the value of the bits B2 to B12 is determined with the aid of the reference REF. Thus, the leaves F1 to F15, SL and ST correspond to the codes W1 to W15, WSL and WST indicated in Table I. The leaves EF1 to EF10 correspond to statistic codewords which are rendered incorrect by, for example, transmission errors. The word W8 is made to correspond in any random decoding manner to leaves EF1 to EF7 and EF9, and the words W9 and W7 to the leaves EF8 and EF10. This is illustrated in the Table II.

TABLE II

| Column 1<br>Ref. of the<br>identified words | Column 2<br>Statistic code<br>(in binary notation) | Column 3<br>Length | Column 4<br>Ref of the<br>leaf |
| --- | --- | --- | --- |
| W8 | 00001        | 5  | EF1  |
| W8 | 000001       | 6  | EF2  |
| W8 | 00000010     | 8  | EF3  |
| W8 | 000000110    | 9  | EF4  |
| W8 | 0000001110   | 10 | EF5  |
| W8 | 00000011110  | 11 | EF6  |
| W8 | 000000111110 | 12 | EF7  |
| W8 | 000100110101 | 12 | EF8  |
| W9 | 000100110111 | 12 | EF9  |
| W7 | 000100111011 | 12 | EF10 |

These statistic words are thereafter stored in a transmitting buffer memory 20 via a multiplexer 22. The data contained in the memory 20 are utilized by a transmitter member 24 for transmission via a transmission channel 26.

FIG. 3 shows the receiving section R of an arrangement according to the invention. Reference numeral 30 denotes a receiver member receiving the data transmitted via the channel 26. These data are stored in a receiving buffer memory 32. A statistic word decoder 35 recovers the words W— to apply them to an interface member 38. Preferably, this decoder is of the type described in the French Patent Application filed by Applicants on Dec. 6th, 1988 under number 88 15 959. The member 38 cooperates with a time base 40 to ensure that the appropriate signals are applied to a display member 42.

Figure 5A:
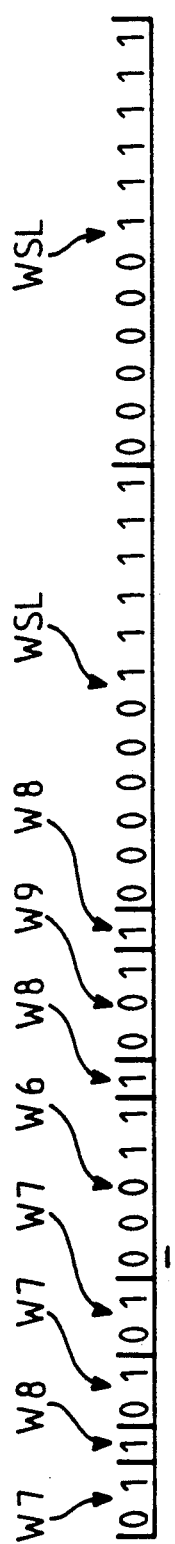
FIGS. 5a-5c are intended to show the disturbing effects of transmission errors on the code series.
Figure 5B:
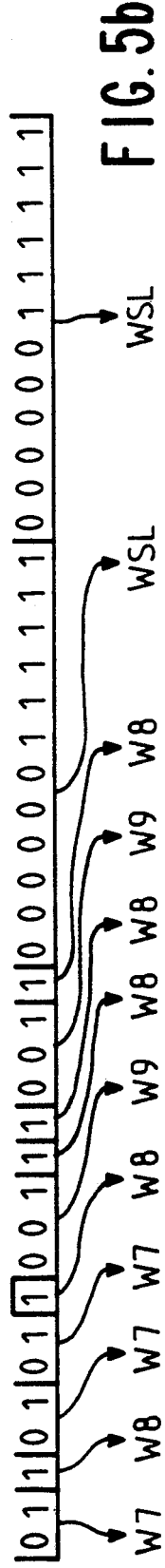

FIG. 4 shows schematically picture elements $L_1$, $L_2$, ..., $L_n$ which are transmitted by the arrangement according to the invention. A word W . . . is assigned to each pixel (picture element); for example the line $L_1$ includes among its words the sequence of eight words W7, W8, W7, W7, W6, W8, W9, W8. A series of statistic words, shown in FIG. 5a, will correspond with this sequence. If due to a transmission error a bit is inverted, for example the underlined bit, this series will produce the sequence of ten words W7, W8, W7, W7, W8, W9, W8, W8, W9, W8 as is illustrated in FIG. 5b. Thus, this amounts to a time shift in the correspondence between the code and the location of the pixels. The present invention has therefore for its object to provide means which from time to time or periodically ensure the proper correspondence of the codewords with their pixels. Preferably, this correspondence is ensured for each picture line. To that end, at least two self-synchronizing codewords WSL (see FIGS. 4 and 5) are inserted as synchronizing words at the end of each line. The retained self-synchronizing word is the word WSL which corresponds to the leaf SL; this word is consequently: "000000111111".

It is shown that in conformity with the definition given in the foregoing, this word has a suffix "111111" which is the concatenation of six words "1" (word W8, Table I). Thus, if a series (a line in the present application) has been transmitted in a faulty manner, the suffix of the first WSL will render a recognition of the second word WSL possible, which word is used as the synchronizing words.

Figure 5C:
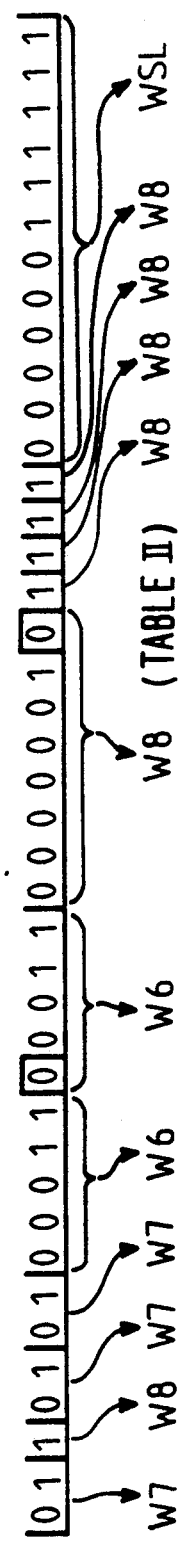

FIG. 5c illustrates the case in which two transmission errors are produced. They are boxed in in FIG. 5c. The first affects the pixels of the image and even causes decoding of the word W8 from Table II which assigns codes to the faulty bit chain. The second error affects the synchronizing word WSL itself, but the second word WSL is recognised and the synchronization is ensured.

For that purpose, the arrangement of the invention is formed in the following manner.

A correction member 50 is inserted between the output of the decoder 35 and the input of the interface member 38. The member 50 includes a decoding member 55 for recognising the words WSL, a synchronizing buffer store 60 (which memory is of the FIFO type, of the type NPD42505C produced by NEC, for example) to contain a complete line of samples which are decoded by the decoder 35, a write counter 68 to select the location in the memory 60 of the sample to be entered, a read counter 70 to select the location in the memory 60 of the sample to be applied to the member 38, a sequencing member 78 to manage the function of the correction member 50 and a set of dual-input AND gates 80, 81 and 82 which cooperate with the sequencing member 78. The gate 80 connects via its first input and its output the decoding member 55 to the sequencing member 78. The second input receives a validation signal WD which defines a decoding "window" at an instant at which the word WSL will probably appear, as a result of which an erroneous recognition during a line is prevented. The outputs of the AND gates 81 and 82 are connected to the counting inputs of the counters 68 and 70; at one of their inputs they receive a signal CK which originates from the time base 40 and lays down the appearance of samples to be applied to the display member 42. The other input of the gate 81 is connected to the member 78 for the reception of EW which enables the counter 68 to continue counting and the decoder 35 to function. The other input of the gate 82 is also connected to the member 78 for the reception of a signal ER which allows the counter 70 to progress or not. The member 78 also supplies signals RZW to reset the content of the counter 68 and signals RZR to reset the content of the counter 70. The member 78 processes these different signals as a function of the output signal of the gate 80, as has already been described, and also as a function of the content of the counter 68 and the signals QW and QR supplied by the counter 68 and 70 to indicate that they are at their maximum capacity.

The sequencing member can easily be designed on the basis of the following considerations: let it be assumed that the lines have "p" pixels which correspond to the counting capacities of the counter 68 and 70 and the following cases will now be investigated.

1) The number of decoded samples is equal to "p" (normal operation).

In this case the first word WSL is recognized when the content of the counter 68 is equal to "p", so the latter is reset to zero when the word WSL is recognized a second time. The content of the counter 70 is reset to zero from the moment at which it reaches its maximum value; the signal QR then assumes its active value.

2) The number of decoded samples is less than "p".

As in the foregoing, the appearance of WSL resets the counter 68 to zero and the signal EW blocks the decoder 35 and prevents the counter 68 from continuing its counting operation as the counter 70 has not yet reached its maximum position (QR active).

3) The number of decoded samples exceeds "p", i.e. p+K samples are decoded before the appearance of WSL.

The mode of operation in this case is illustrated by FIG. 6. In this Figure ADW and ADR represent the content of the counters 68 and 70.

Let us now consider the instant $t=T-1$ at which the content of the counter 68 is $p-1$. In this location the sample relating to a line $L_O$ is entered which implies that the locations 1 to $p-1$ are occupied by samples representing the pixels of the line $L_O$ (see caption in FIG. 7). At this instant the content of the counter 70 is p; in this location there is the sample which represents a pixel belonging to the previous line $L_{-1}$.

At the instant $t=T$ the contents ADW and ADR are p and 1, respectively, the first sample of the line $L_O$ is read.

At the instant $t=T+1$ a second sample of $L_O$ is read, but the sample entered into the memory 60 will never be read as will be explained hereinafter.

At the instant $t=T+k$, k samples which will never be read are entered into the memory and at this instant WSL appears, which has for its effect that at the instant $t=T+k+1$ the counter 68 is triggered and ADW=1, but the counter 70 continues counting up to the instant $T+p-1$ at which it reaches its maximum position "p"; the signal ER becomes active and blocks the counter at this content until the content of the counter 68 reaches $p-1$ at the instant $T+p+k-1$; at the following instant $t=T+p+k$ the correspondence between the sample and the location of the pixel is considered as having been satisfied.

We claim:

1. An apparatus for encoding an image signal comprising a plurality of line signals into sequences of digital codewords, said apparatus comprising:
   a) means for converting a line signal into a series of digital samples;
   b) means, coupled to said converting means, for statistically encoding each of said digital samples so as to form a series of first codewords; and
   c) means, coupled to said encoding means, for forming a sequence of digital codewords by appending at least two statistically coded self-synchronizing codewords to the end of said series of said first codewords.

2. The apparatus of claim 1, further comprising means, coupled to said forming means, for transmitting said sequence of digital codewords.

3. An apparatus for decoding a sequence of digital codewords encoded by the apparatus of claim 2, said apparatus comprising:
   a) means for receiving said sequence of digital codewords;
   b) means, coupled to said receiving means, for statistically decoding said received sequence of digital codewords so as to derive said series of digital samples and a recognizing signal indicating the end of said series of digital samples;
   c) a storage member coupled to said decoding means, to which said series of digital samples is written, and from which a plurality of said written digital samples is read;
   d) a write counter coupled to said storage member, which is incremented in response to a first signal so as to provide address codes defining locations in said storage member into which each of said digital samples is written;
   e) a read counter coupled to said storage member, which is incremented in response to a second signal so as to provide address codes defining locations in said storage member from which each of said selected written digital samples are read; and
   f) a sequencing member for providing said first and second signals as a function of said recognizing signal.

* * * * *